UNITED STATES PATENT OFFICE.

HENRY GRIFFITH, JR., OF BIRMINGHAM, ENGLAND, ARTHUR EDWARD KEMPLEN, OF BÉCON-LES-BRYÉRES, AND VICTOR COPPÉE, OF LEVALLOIS-PERRET, FRANCE.

ALLOY FOR SOLDERING.

SPECIFICATION forming part of Letters Patent No. 616,613, dated December 27, 1898.

Application filed September 23, 1897. Serial No. 652,730. (Specimens.)

*To all whom it may concern:*

Be it known that we, HENRY GRIFFITH, Jr., residing at Warstone lane, in the city of Birmingham, England, ARTHUR EDWARD KEMPLEN, residing at 61 Rue de la Sabbiére, Bécon-les-Bryéres, France, subjects of the Queen of Great Britain, and VICTOR COPPÉE, a citizen of France, residing at 6 Rue de Dequingand, Levallois-Perret, (Seine,) France, have invented certain new and useful Improvements Relating to Alloys for the Soldering of Aluminium, of which the following is a specification.

This invention consists of improvements relating to the soldering of aluminium, the object being to enable pieces of aluminium of various forms or shapes to be readily and effectually united together by a simple soldering alloy.

The alloy is formed from fifty parts of zinc and ten parts of tin or bismuth, the two metals being united by fusion and cast and rolled to the thickness of about two millimeters. The plates thus made are electroplated with nickel or silver, and when withdrawn from the bath are preferably subjected to a hammering or a compressing force and cut into strips before use in soldering.

The pieces of aluminium to be soldered are heated at the ends or at the parts at which they are to be joined sufficiently to melt the end of the soldering-strip when placed in contact therewith. When the ends or parts to be joined are coated with the solder, they are held together in sufficient heat to flush the solder and afterward allowed to cool. They will then be effectually united.

The purpose of plating is to effect the combination of the nickel or silver with the alloy, this being the only way of combining a small quantity of the nickel or silver which is required.

Having now described our invention, what we claim as new, and desire to secure by Letters Patent, is—

A soldering substance consisting of an alloy of zinc and tin having nickel electroplated thereon.

In witness whereof we have hereunto set our hands in presence of two witnesses.

HENRY GRIFFITH, JUNR.
 ARTHUR EDWARD KEMPLEN.
 VICTOR COPPÉE.

Witnesses:
 EDWARD MARKS,
 HERBERT BOWKETT.